United States Patent
Habermeier et al.

[11] 3,894,016
[45] July 8, 1975

[54] POLYACRYLATES OF ISOCYANURATES

[75] Inventors: Juergen Habermeier, Pfeffingen; Daniel Porret, Binningen; Ernst Leumann, Arlesheim, all of Switzerland

[73] Assignee: Ciba-Geigy Corporation, Ardsley, N.Y.

[22] Filed: Jan. 16, 1974

[21] Appl. No.: 433,629

Related U.S. Application Data
[62] Division of Ser. No. 217,629, Jan. 13, 1972, Pat. No. 3,808,226.

[30] Foreign Application Priority Data
June 14, 1971 Switzerland.......................... 8634/71
Jan. 15, 1971 Switzerland.......................... 624/71

[52] U.S. Cl....... 260/248 NS; 260/86.1 N; 260/257; 260/260; 260/309.7
[51] Int. Cl............................................ C07d 55/38
[58] Field of Search .............................. 260/248 NS

[56] References Cited
UNITED STATES PATENTS
3,808,226    4/1974    Habermeier et al. ........... 260/248 X

*Primary Examiner*—John M. Ford
*Attorney, Agent, or Firm*—Vincent J. Cavalieri

[57] ABSTRACT
New polyacrylates of the formula

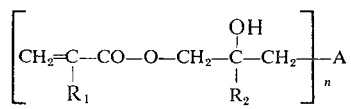

wherein $R_1$ and $R_2$ denote a hydrogen atom or the methyl group and n denotes the number 2 or 3 and A denotes an organic radical which contains at least one grouping

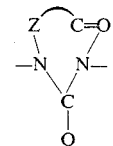

wherein Z represents a divalent radical required to complete a five-membered or six-membered ring, are obtained if n mols of acrylic acid and/or methacrylic acid are added onto polyglycidyl compounds of the formula

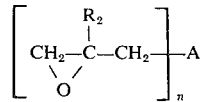

wherein $R_2$, n and A have the same meaning as above.

The new polyacrylates are valuable resins which can be polymerised by themselves or together with other polymerisable monomers, whilst being shaped. The resulting mouldings or coatings display good mechanical properties.

2 Claims, No Drawings

POLYACRYLATES OF ISOCYANURATES

This is a Divisional of application Serial No. 217,629, filed on January 13, 1972, now U.S. Pat. No. 3,808,226, which issued on Apr. 30, 1974.

The subject of the present invention are new polyacrylates of the general formula

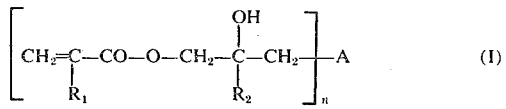 (I)

wherein $R_1$ and $R_2$ independently of one another each represent a hydrogen atom or the methyl group, $n$ denotes the number 2 or 3 and A denotes an organic radical which contains at least one grouping

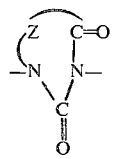

in which Z denotes a divalent radical which is required to complete a five-membered or six-membered, unsubstituted or substituted, heterocyclic ring.

The radical Z in the N-heterocyclic grouping of the formula I preferably only contains carbon and hydrogen atoms or carbon, hydrogen and oxygen atoms. It can, for example, be a radical of the formulae

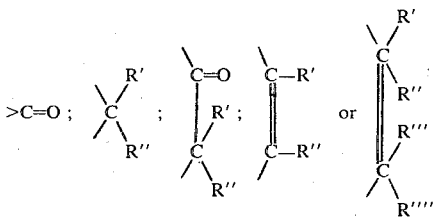

wherein R', R'', R''' and R'''' independently of one another can each denote a hydrogen atom or, for example, an alkyl radical, preferably a lower alkyl radical with 1 – 4 C atoms, an alkenyl radical, preferably a lower alkenyl radical with 1 – 4 C atoms, a cycloalkyl radical or an optionally substituted phenyl radical.

The radical Z can, however, also consist of a nitrogencontaining radical of the formula

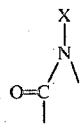

wherein X represents the acryloxy- or methylacryloxy-2-hydroxypropyl or -2-hydroxy-2-methylpropyl radical according to the formula I.

The new acrylates of the formula I can be manufactured if n mols of acrylic acid and/or methacrylic acid are added, in a manner which is in itself known, to 1 mol of a polyglycidyl compound of the general formula

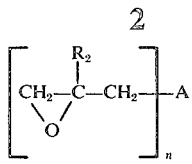 (II)

wherein $R_2$, n and A have the same meaning as in the formula I above.

The addition reaction is preferably carried out in the melt; however, it can also be carried out in solution. The addition of the acrylic acid or methacrylic acid is effected at 20°–180°C, preferably at 60°–140°C, without catalysts or in the presence of basic catalysts. The course of the addition reaction can easily be followed by continuously examining the epoxide content of the reaction mixture or by titration of the unreacted acrylic acid or by titration of the acrylic acid ester groups formed.

Suitable basic catalysts for the addition of acrylic acid or methacrylic acid to the polyglycidyl compound of the formula II are above all tertiary amines, such as triethylamine, tri-n-propylamine, benzyldimethylamine, N,N'-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; further, ion exchange resins possessing tertiary or quaternary amino groups; further, trialkylhydrazonium salts, such as trimethylhydrazonium iodide.

Further suitable catalysts are also low molecular thioethers and sulphonium salts.

As such thioethers or sulphonium salts there may be mentioned: diethyl-sulphide, β-hydroxyethyl-ethyl-sulphide, β-hydroxypropyl-ethyl-sulphide, ω-hydroxytetramethyleneethyl-sulphide, thiodiglycol, mono-β-cyanoethylthioglycolether, dibenzyl-sulphide, benzylethyl-sulphide, benzylbutyl-sulphide, trimethylsulphonium iodide, tris(β-hydroxyethyl)sulphonium chloride, dibenzylmethylsulphonium bromide, 2,3-epoxypropylmethylethylsulphonium iodide, dodecylmethylsulphide and dithiane.

The reaction can, however, also be accelerated by adding other suitable alkaline reagents, such as sodium hydroxide, potassium hydroxide, barium hydroxide, calcium hydroxide, sodium carbonate, potassium carbonate and sodium acetate.

The polyglycidyl compounds of the formula II are known compounds and can be manufactured if N-heterocyclic compounds which contain at least one grouping

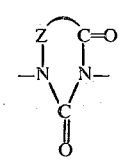

in which Z denotes a divalent radical which is necessary to complete a five-membered or six-membered, unsubstituted or substituted, heterocyclic ring, are reacted in one step or several steps with an epihalogenohydrin or β-methylepihalogenohydrin, such as, for example, epichlorohydrin, β-methylepichlorohydrin or epibromohydrin, with elimination of hydrogen halide, in a manner which is in itself known.

The polyglycidyl compounds of the formula II used for the manufacture of the new polyacrylates of the formula I are above all mononuclear and binuclear N-heterocyclic polyglycidyl compounds.

The mononuclear polyglycidyl compounds of the formula II correspond to the general formula

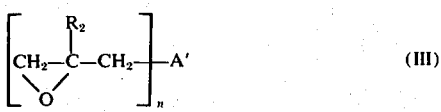
(III)

wherein $R_2$ represents a hydrogen atom or the methyl group, $n$ denotes the number 2 or 3 and A' denotes an organic radical which contains one grouping

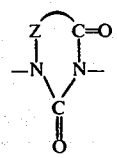

in which Z denotes a divalent radical which is necessary to complete a five-membered or six-membered, unsubstituted or substituted, heterocyclic ring.

A preferred sub-category of mononuclear N-heterocyclic polyglycidyl compounds of the formula III corresponds to the formula

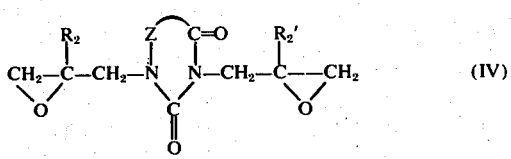
(IV)

wherein $R_2$ and $R_2'$ independently of one another represent a hydrogen atom or the methyl group and Z has the same meaning as in the formula III. There may be mentioned the N,N'-diglycidyl compound of the formula

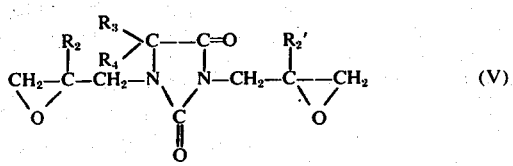
(V)

wherein $R_2$ and $R_2'$ have the same meaning as in the formula IV and wherein $R_3$ and $R_4$ each denote a hydrogen atom or a lower alkyl radical with 1 to 4 carbon atoms, or wherein $R_3$ and $R_4$ together form a tetramethylene or pentamethylene radical; examples of this category of compounds are, for example: 1,3-diglycidylhydantoin, 1,3-diglycidyl-5-methylhydantoin, 1,3-diglycidyl-5-n-propylhydantoin, 1,3-diglycidyl-5-methyl-5-ethylhydantoin, 1,3-diglycidyl-1,3-diazaspiro(4.5)-decane-2,4-dione, 1,3-diglycidyl-1,3-diazaspiro(4.4)-nonane-2,4-dione and especially 1,3-diglycidyl-5,5-dimethylhydantoin, 1,3-diglycidyl-5-isopropylhydantoin, and also 1,3-di-(β-methylglycidyl)-5,5-dimethylhydantoin.

Further, there may be mentioned N,N'-diglycidyl compounds of the formula

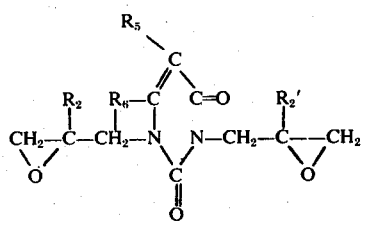

wherein $R_2$ and $R_2'$ have the same meaning as in the formula IV and wherein $R_5$ and $R_6$ independently of one another each denote a hydrogen atom or a lower alkyl radical with 1 to 4 carbon atoms; examples of this category of compounds are, for example, 1,3-diglycidyluracil, 1,3-diglycidyl-6-methyluracil, 1,3-diglycidyl-5-methyluracil and 1,3-di-(β-methylglycidyl)uracil.

Further, there should be mentioned N,N'-diglycidyl compounds of the formula

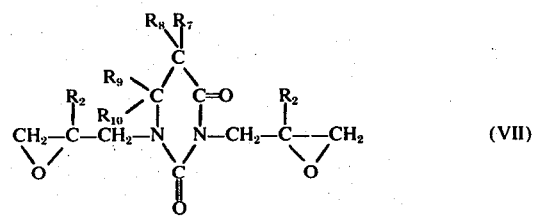
(VII)

wherein $R_2$ and $R_2'$ have the same meaning as in the formula IV and wherein $R_7$ and $R_8$ both denote hydrogen atoms or identical or different alkyl radicals, preferably alkyl radicals with 1 to 4 carbon atoms, and $R_9$ and $R_{10}$ independently of one another each denote a hydrogen atom or a, preferably lower, alkyl radical with 1–4 C atoms.

Examples of this category of compounds are, for example, 1,3-diglycidyl-5,5-dimethyl-5,6-dihydrouracil, 1,3-diglycidyl-5,5-dimethyl-6-isopropyl-5,6-dihydrouracil and 1,3-di-(β-methylglycidyl)-5,5-dimethyl-5,6-dihydrouracil. Additionally, attention should be drawn to the N,N'-diglycidyl compounds of barbituric acid and of parabanic acid.

A further preferred sub-category of mononuclear N-heterocyclic polyglycidyl compounds of the formula III corresponds to the general formula

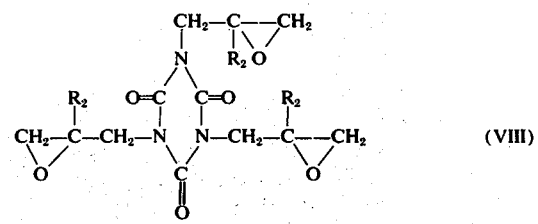
(VIII)

wherein $R_2$ has the same meaning as in the formula III. Examples of these categories of compounds are triglycidylisocyanurate and tri-(β-methylglycidyl)isocyanurate.

A further preferred sub-category of mononuclear N-heterocyclic polyglycidyl compounds of the formula III corresponds to the general formula

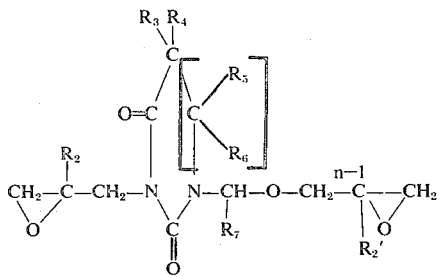

wherein $R_2$ and $R_2'$ independently of one another represent a hydrogen atom or the methyl group and wherein $R_3$ and $R_5$ independently of one another each denote a hydrogen atom or an aliphatic, cycloaliphatic, araliphatic or aromatic hydrocarbon radical, such as, in particular, a lower alkyl radical with 1 to 4 carbon atoms, $R_4$, $R_6$ and $R_7$ each represent an alkyl radical, especially a lower alkyl radical with 1 to 4 carbon atoms, or a hydrogen atom, or $R_3$ and $R_4$ together form a divalent aliphatic or cycloaliphatic hydrocarbon radical, preferably a tetramethylene or pentamethylene radical, and $n$ denotes an integer having a value of 1 or 2.

As examples of this category of compounds there may be mentioned: 1-glycidyloxymethyl-3-glycidyl-5,5-dimethylhydantoin, 1-(1'-glycidyloxyethyl)-3-glycidyl-5,5-dimethylhydantoin, 1-glycidyloxymethyl-3-glycidyl-5-isopropylhydantoin, 1-glycidyloxymethyl-3-glycidyl-5,5-tetramethylenehydantoin, 1-glycidyloxymethyl-3-glycidyl-5-ethyl-5-methylhydantoin and 1-glycidyloxymethyl-3-glycidyl-5,5-dimethyl-5,6-dihydrouracil.

A further preferred sub-category of mononuclear N-heterocyclic polyglycidyl compounds of the formula III corresponds to the general formula

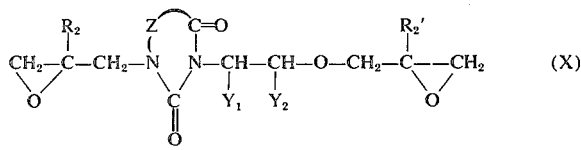

wherein $R_2$ and $R_2'$ independently of one another each denote a hydrogen atom or the methyl group, Z denotes a nitrogenfree divalent radical which is required to complete a five-membered or six-membered, unsubstituted or substituted heterocyclic ring, and wherein $Y_1$ represents a hydrogen atom or the methyl group and $Y_2$ represents a hydrogen atom or the methyl, ethyl or phenyl group, or wherein $Y_1$ and $Y_2$ together denote the trimethylene or tetramethylene radical.

As examples of this category of compounds there may be mentioned: 1-glycidyl-3-($\beta$-glycidyloxyethyl)-6-methyluracil, 1-glycidyl-3-($\beta$-glycidyloxyethyl)-5,5-dimethylhydantoin, 1-glycidyl-3-($\beta$-glycidyloxy-n-propyl)-5,5-dimethyl-6-isopropyl-5,6-dihydrouracil, 1-$\beta$-methylglycidyl-3-[$\beta$-($\beta'$-methylglycidyloxy)-ethyl]-5,5-dimethylhydantoin, 1-glycidyl-3-($\beta$-glycidyloxy-$\beta$-phenylethyl)-5,5-dimethylhydantoin, 1-glycidyl-3-($\beta$-glycidyloxy-$\beta$-phenylethyl)-5-ethyl-5-phenylbarbituric acid, 1-glycidyl-3-($\beta$-glycidyloxy-n-butyl)-5,5-dimethylhydantoin and 1-glycidyl-3-($\beta$-glycidyloxycyclohexyl)-5,5-dimethylhydantoin.

The binuclear polyglycidyl compounds according to the formula II used for the manufacture of the new polyacrylates of the formula I correspond to the general formula

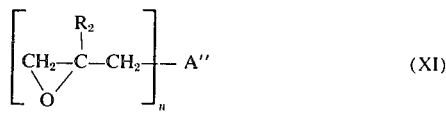

wherein $R_2$ represents a hydrogen atom or the methyl group and A'' denotes an organic radical of the formula

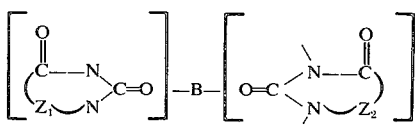

in which $Z_1$ and $Z_2$ independently of one another each denote a divalent radical which is necessary to complete a five-membered or six-membered, unsubstituted or substituted heterocyclic ring, and B represents a divalent aliphatic, cycloaliphatic or araliphatic radical, and in particular preferably an alkylene radical, or an alkylene radical which is interrupted by oxygen atoms or ester groups.

A preferred sub-category of binuclear N,N'-diglycidyl compounds of the formula XI corresponds to the general formula

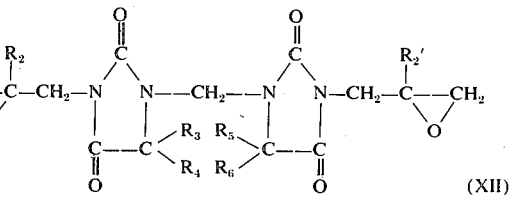

wherein $R_2$ and $R_2'$ independently of one another represent a hydrogen atom or the methyl group and $R_3$, $R_4$, $R_5$ and $R_6$ each denote a hydrogen atom or a lower alkyl radical with 1 to 4 carbon atoms, or wherein $R_3$ and $R_4$ or $R_5$ and $R_6$ together form a tetramethylene or pentamethylene radical; examples of this category of compounds are, for example, bis-(3-glycidyl-5,5-dimethylhydantoinyl-1)-methane, bis-(3-glycidyl-5-methyl-5-ethylhydantoinyl-1)-methane and bis-(3-glycidyl-5-propylhydantoinyl-1)-methane.

A further preferred sub-category of binuclear N,N'-diglycidyl compounds of the formula XI corresponds to the general formula

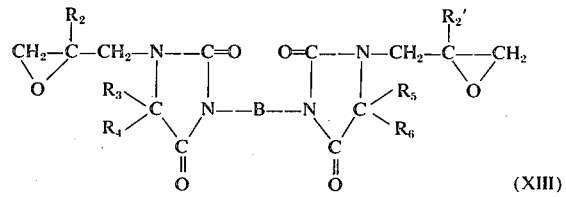

wherein $R_2$ and $R_2'$ have the same meaning as in the formula xII, B represents an aliphatic, cycloaliphatic or araliphatic radical and $R_3$, $R_4$, $R_5$ and $R_6$ each denote a hydrogen atom or a lower alkyl radical with 1 to 4 carbon atoms, or wherein $R_1$ and $R_2$ and/or $R_3$ and $R_4$ together form a tetramethylene or pentamethylene radical; examples of this category of compounds are, for example, bis-(1-glycidyl-5,5-dimethylhydantoinyl-3)-methane, 1,2-bis-(1'-glycidyl-5',5'-dimethylhydantoinyl-3')-ethane, 1,4-bis-(1'-glycidyl-5',5'-dimethylhydantoinyl-3')-butane, 1,6-bis-(1'-glycidyl-5',5'-dimethylhydantoinyl-3')-hexane, 1,12-bis-(1'-glycidyl-5',5'-dimethylhydantoinyl-3')-dodecane, $\beta,\beta'$-bis-(1'-glycidyl-5',5'-dimethylhydantoinyl-3')-diethyl-ether and 1,4-bis-(1'-$\beta$-methylglycidyl-5',5'-dimethylhydantoinyl-3')-butane.

A further preferred sub-category are binuclear N,N'-diglycidyl compounds of the following formula

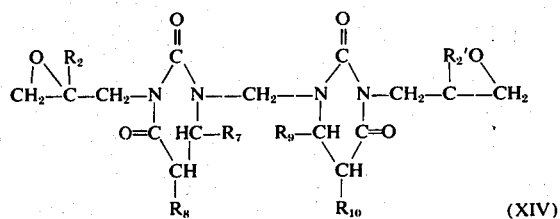

(XIV)

wherein $R_2$ and $R_2'$ have the same meaning as in the formula XII and $R_7$, $R_6$, $R_9$ and $R_{10}$ independently of one another each denote a hydrogen atom or a lower alkyl radical with 1 to 4 carbon atoms; examples of this category of compounds are, for example, 3,3'-diglycidyl-1,1'-methylene-bis-(5,6-dihydrouracil), 3,3'-diglycidyl-1,1'-methylene-bis-(6-methyl-5,6-dihydrouracil), 3,3'-diglycidyl-1,1'-methylene-bis-(5,5-dimethyl-5,6-dihydrouracil) and 3,3'-di-($\beta$-methylglycidyl)-1,1'-methylene-bis-(5,6-dihydrouracil).

A further preferred sub-category of binuclear N,N'-diglycidyl compounds of the formula XI corresponds to the general formula

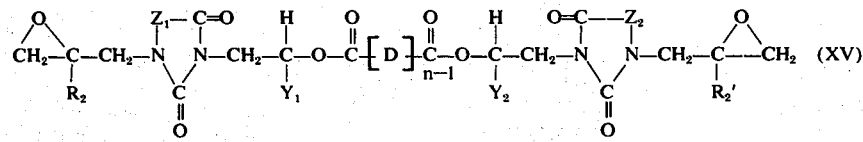 (XV)

wherein $R_2$ and $R_2'$ have the same meaning as in the formula XII, $Y_1$ and $Y_2$ each represent a hydrogen atom, a methyl group, an ethyl group or a phenyl group, $Z_1$ and $Z_2$ independently of one another each denote a nitrogen-free, divalent radical which is necessary to complete a five-membered or six-membered, unsubstituted or substituted heterocyclic ring, D represents the hydrocarbon radical of a dicarboxylic acid obtained by removing the carboxyl groups and $n$ denotes the number 1 or 2.

Examples of this category of compounds are, for example, sebacic acid bis-(N-glycidyl-5,5-dimethylhydantoinyl-3-2'-hydroxy-n-propyl ester), sebacic acid bis-(N-glycidyl-5,5-dimethylhydantoinyl-3-2'-hydroxy-n-butyl ester), glutaric acid bis-(N-glycidyl-5,5-dimethylhydantoinyl-3-2'-hydroxy-n-propyl ester) and succinic acid bis-(N-glycidyl-5,5-dimethylhydantoinyl-3-2'-hydroxyethyl ester).

The new polyacrylates of the formula I are colourless to slightly coloured, liquid to highly viscous or solid resins, the acrylate group content of which can be determined, for example, by titration, hydrogenation or NMR-analysis. The acrylates thus obtained can be prevented from premature polymerisation by the addition of customary inhibitors, for example hydroquinone, tert.-butylhydroquinone, phenothiazine, di-tert.butylhydroquinone, Cu salts and the like.

The polyacrylates of the formula I, manufactured according to the invention, are valuable resins which can be polymerised either by themselves or together with other polymerisable monomers, whilst being shaped or in the form of sheet-like structures.

Possible monomers which can be added to the new polyacrylates of the formula (I) are above all compounds of the acrylic acid series, such as esters of acrylic acid or methacrylic acid and alcohols or phenols, for example methyl acrylate, ethyl acrylate, butyl acrylate, dodecyl acrylate and methyl methacrylate; acrylonitrile, methacrylonitrile and ethylene glycol dimethacrylate. Furthermore, it is also possible to use other reactive olefinically unsaturated monomers, such as, for example, styrene, divinylbenzene, vinyl acetate and others.

The customary catalysts which form free radicals are preferably used for the polymerisation or copolymerisation; there may be mentioned hydrazine derivatives, for example hydrazine hydrochloride, organometallic compounds, such as lead tetraethyl and, in particular, aliphatic azo compounds, such as $\alpha,\alpha'$-azoisobutyrodinitrile and organic peroxides or persalts, such as, for example, peracetic acid, acetyl peroxide, chloroacetyl peroxide, trichloroacetyl peroxide, benzoyl peroxide, chlorobenzoyl peroxide, benzoyl acetyl peroxide, propionyl peroxide, fluorochloropropionyl peroxide, lauryl peroxide, cumene hydroperoxide, cyclohexanone hydroperoxide, tert.-butyl hydroperoxide, di-tert.-butyl peroxide, di-tert.-amyl peroxide and p-menthane hydroperoxide, and also inorganic peroxide compounds, such as sodium peroxide, alkali percarbonates, alkali persulphates or alkali perborates, and especially hydrogen peroxide, which can advantageously replace the more expensive benzoyl peroxide. The amount added is chosen, in a known manner, in accordance with the desired course of the reaction or in accordance with the desired properties of the polymer; advantageously, about 0.05 to 10 per cent by weight of the catalyst, calculated relative to the total weight of the polyacrylate or polyacrylate-monomer mixture, are employed, with the total amount of the catalyst being added either initially or in portions during the course of the polymerisation.

In certain cases, cationic or anionic catalysts can also be used.

The new polyacrylates manufactured according to the invention, or their mixture with other polymerisable monomers, can be used in surface protection, in compression moulding compositions, as casting resins and the like.

A further subject of the present application are therefore curable mixtures which are suitable for the manufacture of mouldings, including sheet-like structures, and which contain the polyacrylates according to the invention, optionally together with other polymerisable monomers, and the polymerisation catalysts which are customary for polymerisation curing.

The polymerisable mixtures which are suitable for the manufacture of coatings and compression moulding compositions can additionally contain plasticisers, fillers and, preferably, pigments, for example titanium dioxide.

In the examples which follow, unless otherwise stated, parts denote parts by weight and percentages denote percentages by weight.

shows, through comparison of the integrals for the $CH_3$-protons (singlet at $\delta = 1.45$), for the protons

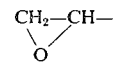

of the residual epoxide (multiplet at $\delta = 2.5-2.9$) and for the vinyl protons $CH_2 = CH—$ (multiplet at 5.9–6.7), that 88% of the substance obtained correspond to the structure indicated below:

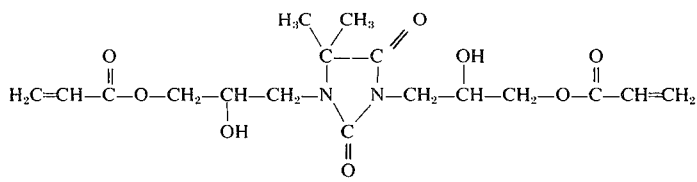

MANUFACTURING EXAMPLES

EXAMPLE 1

258 g of technically manufactured 1,3-diglycidyl-5,5-dimethylhydantoin having an epoxide content of 7.75 equivalents/kg (corresponding to 1.0 mol) are stirred in a dry glass apparatus of 1 litre capacity, equipped with stirrer, thermometer, reflux condenser and dropping funnel, at 100°C and 0.3 g of hydroquinone is added to the clear melt. 147.7 g of distilled acrylic acid (2.05 mols) are immediately added dropwise over the course of 20 minutes, whilst stirring. The reaction becomes exothermic, the heating bath is removed, and a reaction temperature of 122°C then becomes established. After addition of three-fourths of the amount of acrylic acid, 0.1 g of hydroquinone is added and on completion of the addition of acrylic acid a further 0.1 g of hydroquinone is added.

When the exothermic effect has subsided (duration about 15 minutes) the mixture is stirred for a further 90 minutes at 125°–130°C and the pale yellow, clear melt is poured out into a brown bottle. After cooling, the highly viscous resin has a residual epoxide content of 0.3 equivalent/kg. The protonmagnetic resonance spectrum (60 Mc H-NMR, recorded in $CDCl_3$ against tetramethylsilane ($T_MS$) as the internal standard)

The mass spectrum, in which the molecule-ion (M) is virtually not detectable, shows, through the following fragment ions, that the above structure is correct: 366 (=M — $H_2O$); 351 (= 366-$CH_3$); 348 (=366-$H_2O$ or M — 2 $H_2O$): 323 (=M — $C_2H_2O$) etc.

EXAMPLE 2

322.5 g of the 1,3-diglycidyl-5,5-dimethylhydantoin used in Example 1, containing 7.75 epoxide equivalents/kg (1.25 mols), with 0.37 g of hydroquinone added, are reacted with 216 g of methacrylic acid (2.5 mols) at 105°C, analogously to Example 1. The acid is added over the course of 15 minutes. Again, 0.125 g of hydroquinone is added after two-thirds of the amount of acid has been added, and after completion of the addition of the methacrylic acid the same amount of hydroquinone is again added. The reaction is only slightly exothermic. After completion of the addition of methacrylic acid the mixture is stirred for a further 3 hours at 130°–135°C. The cooled adduct is highly viscous, clear and transparent, and light brown in colour; its residual epoxide content is 0.15 equivalent/kg. The protonmagnetic resonance spectrum (60 Mc H-NMR, recorded in $CDCl_3$, against TMS as the internal standard) shows that the adduct obtained has the following structure:

$\delta = 5.70$  
$\delta = 6.24$ } doublet 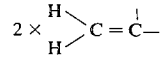

$\delta = 3.4-4.3$, multiplet: 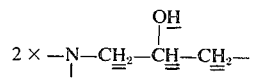

$\delta = 1.98$; singlet: 

$\delta = 1.47$: 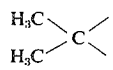

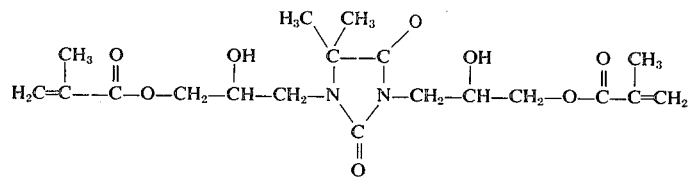

Micro-hydrogenation carried out at room temperature in glacial acetic acid as the solvent and $PtO_2$ as the catalyst, shows a C=C double bond content of 93.4% of theory.

EXAMPLE 3

68.0 g of pure 1,3-diglycidyl-6-methyluracil (0.2855 mol), with 0.0836 g of hydroquinone added, are reacted with 41.2 g of acrylic acid (0.571 mol) at 105°C analogously to Example 1; the duration of the dropwise addition is 20 minutes and after 15 minutes 0.028 g of hydroquinone is added. After completion of the addition of acrylic acid a further 0.028 g of hydroquinone is added. After the dropwise addition the mixture is stirred for a further 2 hours at 130°C. After having cooled, the adduct is clear and transparent, highly viscous and pale yellow in colour. The residual epoxide content is 0.10 equivalent/kg. The proton-magnetic resonance spectrum shows (60 Mc H-NMR; recorded in $CDCl_3$ against TMS as the internal standard), that the following structure is correct:

comes established. After 2/3 of the amount of acrylic acid has been added, 0.2 g of hydroquinone is added. After completion of the addition of acrylic acid, a further 0.2 g of hydroquinone is added. Thereafter the mixture is stirred for a further hour at 124°–130°C and the light yellow-coloured clear melt is then poured out into a dark-coloured glass bottle where the substance which is obtained in quantitative yield solidifies to a practically solid, somewhat tacky resin. The residual epoxide content of the adduct is 0.17 equivalent/kg. The mass spectrum shows, through the molecule-ion M at 464 mass units, that the desired substance has been obtained (theoretical molecular weight 464.5).

The proton-magnetic resonance spectrum (60 Mc H-NMR, recorded in $CDCl_3$ against TMS as the internal standard) also shows that the structure given below is correct: the vinyl protons $CH_2$=CH— are found in multiplets at δ = 5.72 – 6.56. Comparison of the integrations of the vinyl protons and the residual

$δ = 2.31$: singlet: 

$δ = 3.63–4.25$
$δ = 5.1–5.3$ multiplet+ 

$δ = 5.6$: singlet: =C—
           |
           H $δ = 5.75–6.6$: multiplet    2 × $H_2C$=CH—

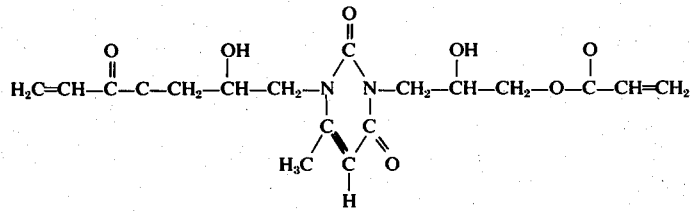

Micro-hydrogenation shows a C=C content of 91.1% of theory.

EXAMPLE 4

443.5 g of technically manufactured triglycidylisocyanurate containing 9.2 epoxide equivalents/kg (1.358 mols) are fused in a glass apparatus according to Example 1, at 110°C, whilst stirring. 0.6 g of hydroquinone is added and 301 g of distilled acrylic acid (4.18 mols) are immediately added dropwise over the course of 22 minutes. The reaction is exothermic so that the heating bath is removed and replaced by a bath of ice water; on doing so, a temperature of 118°C beprotons shows that the crude adduct thus produced consists to the extent of approx. 92% of the desired acrylic acid structure, the remainder being free acrylic acid and epoxide groups. Accordingly, the product essentially consists of the following adduct:

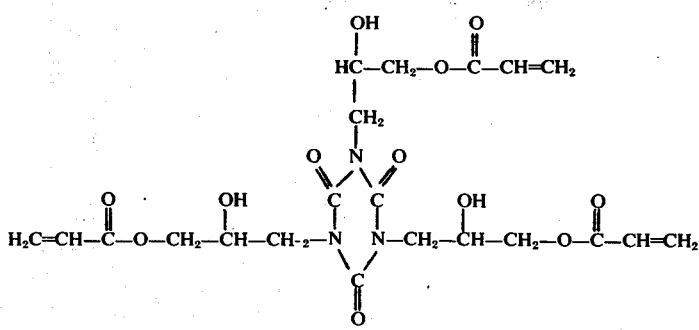

A sample of this crude adduct is treated with a tenfold amount of ethyl acetate at room temperature, using a vibratory mixer. The viscous to solid adduct becomes broken up into a fine light yellow suspension; it is filtered off and dried in a high vacuum at room temperature, and the dry product is triturated. The purified adduct thus obtained is a pale yellow powder which softens at 40°C and melts at 45°–48°C.

EXAMPLE 5

Analogously to Example 1, 276.5 g (1 mol) of a technically manufactured 1-glycidyloxymethyl-3-glycidyl-5,5-dimethylhydantoin (epoxide content 7.24 equivalents/kg) are reacted with 147.7 g of acrylic acid at 100°C, with the addition of 0.3 g of hydroquinone. The acid is added dropwise over the course of 15 minutes and in doing so, 0.1 g of hydroquinone is added after addition of two-thirds of the amount of acrylic acid, again as described in Example 1. After completion of the addition of acrylic acid, 0.1 g of hydroquinone is again added.

The reaction is exothermic. Care is taken, through lowering the heating bath, that the reaction mixture is not heated to above 135°C. When the exothermic effect has subsided, the mixture is further stirred for 2 hours at 125°C and the clear, liquid adduct is cooled in a dark glass bottle. After cooling, the residual epoxide content of the liquid, highly viscous resin is 0.34 equivalent/kg.

| Analytical data: | Found: | Calculated: |
| --- | --- | --- |
| | 52.3% C | 52.3% C |
| | 6.4% H | 6.3% H |

Micro-hydrogenation, carried out at 22°C in glacial acetic acid with PtO₂ as the catalyst shows a C=C—double bond content of 97.9% of theory.

The product corresponds to the following formula:

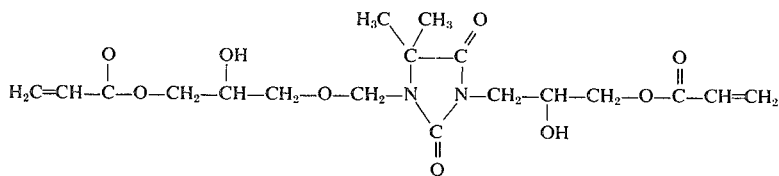

EXAMPLE 6

1,017 g (corresponding to 3 mols) of a technically manufactured 1-glycidyl-3-(β-glycidyloxy-n-propyl)-5,5-dimethyl-hydantoin (epoxide content: 5.9 equivalents/kg) are warmed to 110°C in an apparatus of 2.5 litres capacity, as described in Example 1.

2.9 g of hydroquinone are added and the dropwise addition of 432.4 g of acrylic acid is started immediately. After 10 minutes, one-third of the acrylic acid has been added and the reaction becomes so exothermic that after removal of the heating bath the temperature rises to 125°C.

After 20 minutes, a further 2.9 g of hydroquinone are added. After a total of 35 minutes the entire amount of acrylic acid has been added and after the exothermic effect has subsided the reaction mixture is stirred at 120°–130°C. 20 minutes after completion of the dropwise addition the epoxide content of the reaction mixture is 1.36 equivalents/kg. 120 minutes later, the content of epoxide groups has dropped to 0.3 equivalent/kg. The clear liquid is introduced into a dark bottle. After cooling, the adduct, which is produced quantitatively, is a viscous liquid; the epoxide content is 0.23 equivalent/kg, corresponding to approx. 95% addition. The product principally consists of:

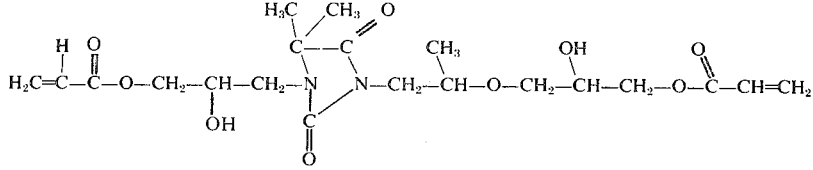

EXAMPLE 7

206 g of technically manufactured 1-glycidyl-3-(β-glycidyloxy-n-propyl)-5,5-dimethylhydantoin (0.591 mol) are stirred at 100°C. 0.3 g of anhydrous sodium acetate and 0.1773 g of hydroquinone are added and 102.2 g of distilled methacrylic acid (1.182 mols) are added dropwise thereto over the course of 30 minutes. When half the amount of acid has been added dropwise, 0.0591 g of hydroquinone are added. After the dropwise addition, a last hydroquinone addition of 0.0591 g is stirred into the reaction mixture and the temperature is raised to 125°C.

75 minutes after completion of the addition of the methacrylic acid, the epoxide content has dropped to 0.768 equivalent/kg. 5 hours after the dropwise addition it has dropped to 0.147 equivalent/kg.

A comparison experiment without the addition of sodium acetate shows an epoxide content of 1.43 equivalents/kg (as compared to 0.768) 75 minutes after completion of the dropwise addition of the methacrylic acid to the reaction mixture; 5 hours after the dropwise addition, 0.39 epoxide equivalent/kg are still present (as compared to 0.147).

Both products essentially correspond to the following structure:

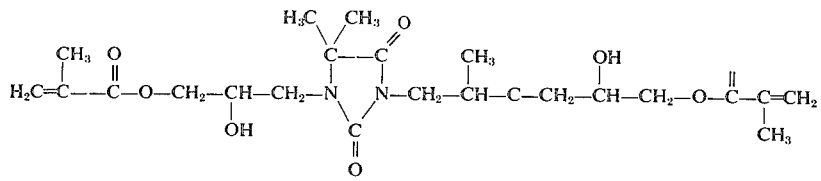

EXAMPLE 8

Analogously to Example 1, 200.2 g of a technically manufactured 3,3'-diglycidyl-1,1'-methylene-bis-(5,5-dimethylhydantoin) containing 5.0 epoxide equivalents/kg (0.5 mol), with 0.15 g of hydroquinone added, are reacted rapidly with 73.8 g of acrylic acid (1.02 mol) at 140°C (supercooled melt). The time for the dropwise addition of the acrylic acid is 6 minutes; in the course thereof 0.05 g of hydroquinone are added after 4 minutes. After completion of the addition of acid, a further 0.05 g of hydroquinone is stirred in. During the dropwise addition, the reaction temperature is lowered to 110°C by removing the heating bath. Thereafter the mixture is stirred for a further 4 hours at 130°–135°C. The product is treated as described in Example 1. The colourless, glass-clear, solid, slightly tacky adduct thus obtained has a residual epoxide content of 0.4 equivalent/kg. The protonmagnetic resonance spectrum (60 Mc-HNMR, solution in CDCl₃, standard: TMS) shows that the structure indicated below is essentially correct:

δ = 1.50; singlet         2 × C(CH₃)(CH₃)

δ = 1.9–1.9; multiplet: intensity very low:

Residual epoxide content = 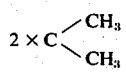

δ = 3.55–4.18; multiplet:     2 × N—CH₂—CH(OH)—CH₂—

δ = 5.10; singlet:              N—CH₂—N

δ = 5.7–6.5: multiplet:        2 × H₂C=CH—

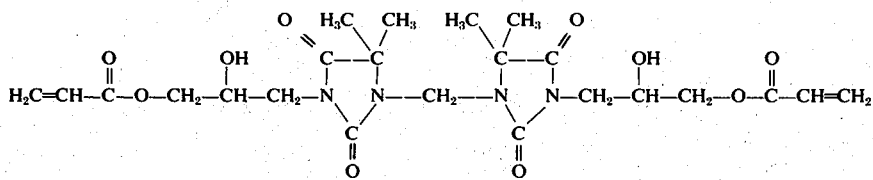

The crude adduct is purified by treating it as was described in Example 8. A colourless, tacky powder is obtained, which melts at 32°C (Mettler FP51 automatic instrument for melting points).

EXAMPLE 9

3,964 g of sebacic acid bis-(N-glycidyl-5,5-dimethylhydantoinyl-3-(2'-hydroxy-n-propyl) ester) having an epoxide content of 3.045 equivalents/kg ($\triangleq$ 6.035 mols) are heated to 100°C in a dry glass apparatus of 6 litres' capacity, equipped with a stirrer, thermometer, reflux condenser and dropping funnel. 9.6 g of hydroquinone are added whilst stirring and the dropwise addition of 869.8 g of freshly distilled acrylic acid is started immediately. The time for the dropwise addition is 60 minutes. The reaction becomes exothermic. After removal of the heating bath, the reaction mixture reaches a temperature of 125°C. The mixture is stirred for a further 8 hours at 125°C and the clear, pale yellowish liquid is poured into a dark glass bottle.

An adduct wherein the residual epoxide content is only about 0.09 equivalent/kg is obtained in quantitative yield. The average molecular weight determined by vapour pressure osmometry is 697 (theory = 698.9). Accordingly, the adduct essentially corresponds to the structure:

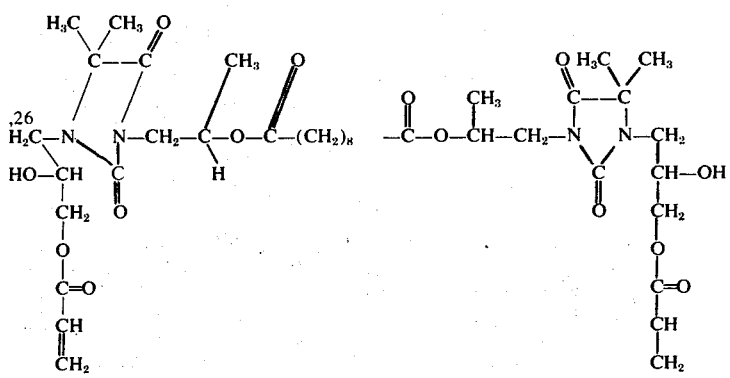

EXAMPLE 10

A mixture of 765 g (2.25 mols) of technical 1-glycidyl-3(2'-glycidyloxy-n-propyl)-5,5-dimethylhydantoin containing 5.9 epoxide equivalents/kg and 570 g (1.0 mol) of a polycarboxylic acid manufactured by dimerisation of unsaturated fatty acids and having an acid equivalent wiight of 292 (containing 75% of dimerised and 25% of trimerised acid; registered trademark EMPOL 1024) are stirred at 130°C under a N₂ atmosphere. The reaction becomes exothermic. The temperature is kept at 130°–140°C by cooling. After 75 minutes, the epoxide content has dropped to 1.95 equivalents/kg. 0.3 g of hydroquinone is now added and 162 g of acrylic acid (2.25 mols) are added dropwise over the course of 45 minutes. The reaction is slightly exothermic. After the addition of acrylic acid, a further 0.3 g of hydroquinone is added and the epoxide content is found to be 0.91 equivalent/kg. After a further 3 hours at 125° C it is 0.44 equivalent/kg. The product, which is obtained quantitatively, is cooled to room temperature and stored in a dark bottle. The bis-acrylic acid ester is a viscous liquid at room temperature.

n-propyl)-5,5-dimethylhydantoin (epoxide content 5.58 equivalents/kg) are reacted with 60.6 g (0.6 equivalent) of sebacic acid with the addition of 0.8 g of triphenylphosphine, at 110°–125° internal temperature, until an acid number of 0–5 is reached; this is the case after approx. 1 hour. The exothermic reaction which occurs in the interim is kept at the indicated temperature by occasional cooling. As a result of the differing reactivity of the two esterifiable epoxide groups, an intermediate product of principally the following structure:

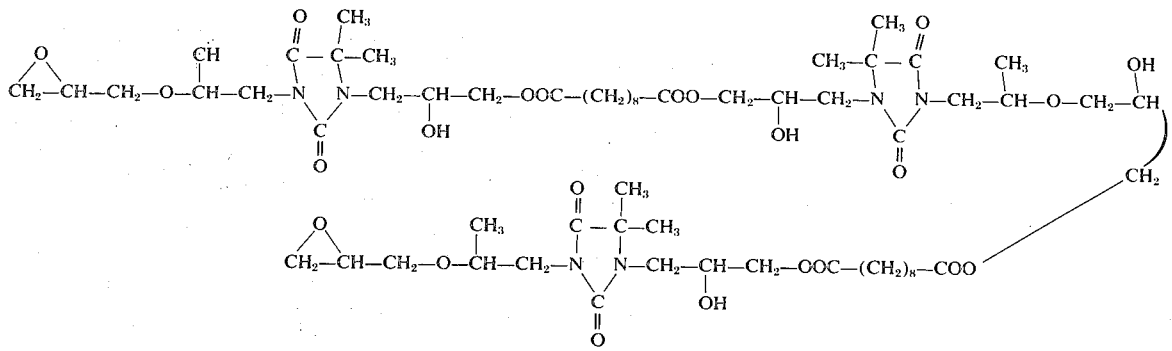

EXAMPLE 11

A mixture of 680 g (2 mols) of technically manufactured 1-glycidyl-3-(2'-glycidyloxy-n-propyl)-5,5-dimethylhydantoin containing 5.9 epoxide equivalents/kg and 563 g (1 mol) of a dibasic acid manufactured by dimerisation of oleic acid, containing an average of 36 C atoms and having an acid equivalent weight of 286 (registered trademark EMPOL 1014) is stirred for 2.5 hours at 130°C. The epoxide content is then 2.0 equivalents/kg. 0.2 g of hydroquinone is added and 144 g of acrylic acid is introduced dropwise over the course of 0.5 hour at 130°C. After the dropwise addition, a further 0.2 g of hydroquinone is added and the mixture is stirred for a further 2½ hours at 130°–135°C.

The mixture is cooled to room temperature and the very viscous product is filled into a dark bottle. The residual epoxide content of the bis-acrylic acid ester obtained is 0.4 equivalent/kg.

EXAMPLE 12 a. Analogously to the preceding examples, 161 g (0.9 equivalent) of a technical 1-glycidyl-3-(2'-glycidyloxyand having an epoxide content of 1.28 equivalents/kg (calculated: 1.35) is obtained.

b. This intermediate product is now stabilized with 0.8 g of hydroquinone and 21.6 g of acrylic acid (0.3 equivalent) are added dropwise over the course of 1 hour, at 110°–120°C. Thereafter the temperature is raised to 130°–140°C and the mixture is left to react until practically all the epoxide groups have been esterified, which is the case after 4–5 hours. A yellow resin which is highly viscous in the cold is obtained in quantitative yield; it has an epoxide content of 0.06 equivalent/kg and an acid number of 10 and is principally to be ascribed the following structure:

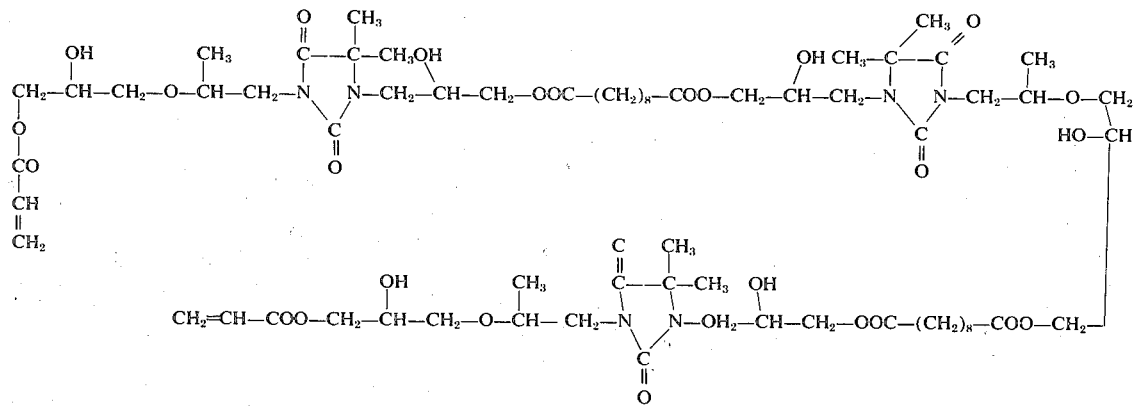

EXAMPLE 13

If instead of the ratio of 0.9 equivalent of the epoxide compound of Example 12, 0.6 equivalent of sebacic acid and 0.3 equivalent of acrylic acid, a ratio of 0.8 equivalent of the epoxide compound of Example 12, 0.4 equivalent of sebacic acid and 0.4 equivalent of acrylic acid is employed and in other respects the reaction is carried out in the same manner as described in Example 9, a yellow resin which is highly viscous when cold is obtained in quantitative yield; it is to be ascribed principally the following structure:

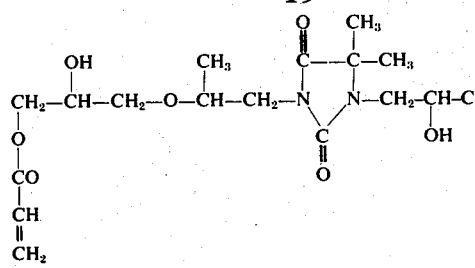
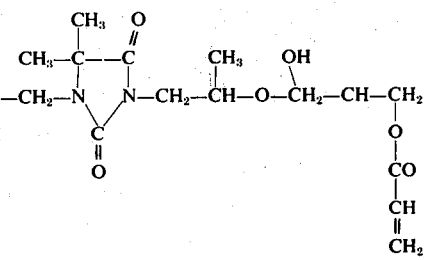

EXAMPLE 14

Analogously to Example 1, 19.0 g (0.0456 mol) of 1,1'-methylene-bis-(3-glycidyl-3,3-dimethyl-5,6-dihydrouracil) having an epoxide content of 4.3 equivalents/kg are reacted with 8.01 g (0.093 mol) of methacrylic acid under the catalytic action of 0.07 g of tetraethylammonium chloride and with 0.09 g of di-tert.-butylhydroquinone as the stabiliser. After 30 minutes at 110°C, the residual epoxide content is 0.35 equivalent/kg. The mixture is cooled and the procedure of Example 1 is followed. The light brown, clear resin is highly viscous and the residual epoxide content is 0.2 equivalent/kg.

EXAMPLE 15

A mixture of 32.5 g (0.0619 mol) of 1,1'-methylene-bis-[3-(2'-glycidyloxyethyl)-5,5-dimethylhydantoin] having an epoxide content of 3.80 equivalents/kg, 10.66 g of methacrylic acid (0.123 mol), 0.1 g of tetraethylammonium chloride and 0.14 g of di-tert.-butylhydroquinone is stirred for 60 minutes at 110°C; the epoxide content is then still 0.6 equivalent/kg. After a further 20 minutes, the procedure according to Example 1 is followed. The colourless, clear resin has a residual epoxide content of 0.3 equivalent/kg and the methacrylate content corresponds to 1.5 equivalents/kg.

EXAMPLE 16

Analogously to Example 1, 148 g (0.25 mol) of 1,3-di-(2'-glycidyloxy-n-butyl)-5,5-dimethyl-6-isopropyl-5,6-dihydrouracil having an epoxide content of 3.37 equivalents/kg are reacted with 43 g (0.5 mol) of methacrylic acid under the action of 0.4 g of tetraethylammonium chloride. 0.48 g of di-tert.-butylhydroquinone, which is added in three portions, is used as the stabiliser.

A clear viscous resin, which in addition to a methacrylate content of 1.92 equivalents/kg has a residual epoxide content of 0.13 equivalent/kg, is obtained in quantitative yield.

EXAMPLE 17

A mixture of 14 g (0.0414 mol) of 92% strength 1-glycidyl-3-(β-methylglycidyl)-5,5-dimethyl-6-isopropyl-5,6-dihydrouracil and 7.13 g (0.0828 mol) of methacrylic acid is reacted together in the presence of 0.081 g of di-tert.-butylhydroquinone and 0.07 g of tetraethylammonium chloride. On warming to 100°C, a strongly exothermic reaction occurs and the temperature of the mixture rises to 150°C. The reaction product is subsequently stirred for a further 15 minutes at 110°C and worked up as described in Example 1. A clear, colourless, bis-methacrylate having a residual epoxide content of 0.1 equivalent/kg is obtained.

EXAMPLE 18

A bis-(methacrylic acid ester) is manufactured analogously to Example 1 from 218.5 g (0.5 mol) of 88% strength 1,3-di(2'-glycidyloxy-n-butyl)-5,5-dimethylhydantoin and 86.1 g of methacrylic acid. Tetraethylammonium chloride (0.8 g) is again used as the catalyst. Stabilisation against premature polymerisation is achieved by means of 1 g of di-tert.-butylhydroquinone which is added in 3 portions.

The mixture is treated in the usual manner and a clear, ochre-yellow resin is obtained, which has a residual epoxide content of 0.2 epoxide equivalent/kg.

EXAMPLE 19

Analogously to Example 1, 28.1 g (0.326 mol) of methacrylic acid are added to 49.5 g (0.163 mol) of 92% strength 1,3-diglycidyl-5,5-pentamethylenehydantoin, using the additives corresponding to the preceding example. A practically solid, colourless adduct is obtained, having an epoxide content of 0.18 equivalent/kg.

EXAMPLE 20

Analogously to the description in Example 1, 43.5 g of 1,4-bis-(1-glycidyl-5,5-dimethylhydantoinyl-3)-butane are reacted with 17.2 g of methacrylic acid and the additives described in Example 14.

A pale yellow, viscous diacrylate is obtained, which has a residual epoxide content of 0.15 equivalent/kg.

USE EXAMPLES

EXAMPLE I 100 parts of the diacrylate manufactured according to Example 1 are stirred at 70°C with 1.5 parts of 50% strength cyclohexanone hydroperoxide and polymerised over the course of 2 hours/80°C and 12 hours/120°C in an aluminium mould of 4 mm wall thickness. A clear, transparent, very hard sheet having the following properties is obtained:

| | | |
|---|---|---|
| Flexural strength | (VSM 77,103) | 16.2 – 17.1 kp/mm² |
| Deflection | (VSM 77,103) | 4.9 – 5.2 |

EXAMPLE II 100 parts of the triacrylate manufactured according to Example 4 are polymerised with 1.5 parts of 50% strength cyclohexanone hydroperoxide as described in Example I. The glass-clear, very hard moulding thus obtained shows the following properties:

| | | |
|---|---|---|
| Flexural strength | (VSM 77,103) | 8.2–9.2 kp/mm² |
| Deflection | (VSM 77,103) | 2.0 mm |
| Water absorption | (96 hours/20°C) | 3.5% |

We claim:
1. A triacrylate of the formula
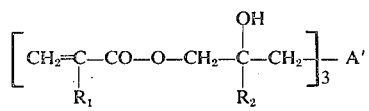
wherein $R_1$ and $R_2$ independently of one another each represent a hydrogen atom or the methyl group and $A'$ is a radical of the formula
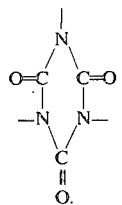
2. A triacrylate according to claim 1, of the formula
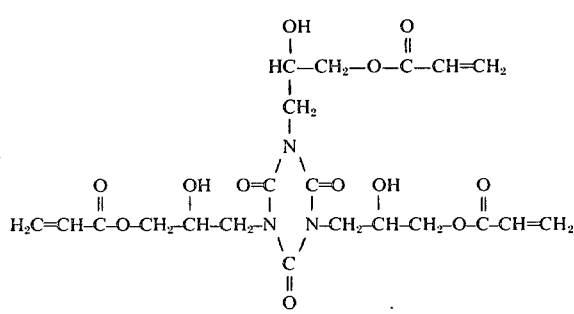
* * * * *